(12) United States Patent
Bowler et al.

(10) Patent No.: US 12,409,609 B2
(45) Date of Patent: Sep. 9, 2025

(54) TUNABLE SYSTEM AND METHOD FOR STRESS RESOLUTION IN ADDITIVE MANUFACTURING

(71) Applicant: HONEYWELL INTERNATIONAL INC., Charlotte, NC (US)

(72) Inventors: John Bowler, Phoenix, AZ (US); Gregory Colvin, Phoenix, AZ (US); Suresh Sundarraj, Mesa, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 45 days.

(21) Appl. No.: 18/449,027

(22) Filed: Aug. 14, 2023

(65) Prior Publication Data

US 2023/0391015 A1 Dec. 7, 2023

Related U.S. Application Data

(63) Continuation of application No. 16/872,618, filed on May 12, 2020, now Pat. No. 11,772,330.

(51) Int. Cl.
| | | |
|---|---|---|
| *B29C 64/393* | (2017.01) | |
| *B29C 64/245* | (2017.01) | |
| *B29C 64/273* | (2017.01) | |

(52) U.S. Cl.
CPC .......... *B29C 64/393* (2017.08); *B29C 64/245* (2017.08); *B29C 64/273* (2017.08)

(58) Field of Classification Search
CPC ... B29C 64/245; B29C 64/273; B29C 64/393; B33Y 30/00; B33Y 50/02; B22F 12/90; B22F 2202/01
See application file for complete search history.

(56) References Cited

U.S. PATENT DOCUMENTS

| | | |
|---|---|---|
| 8,272,424 B2 | 9/2012 | Short |
| 10,539,952 B2 | 1/2020 | Mehr et al. |
| 10,857,735 B1 | 12/2020 | Martin et al. |

(Continued)

FOREIGN PATENT DOCUMENTS

| | | | |
|---|---|---|---|
| CN | 106363173 A | | 2/2017 |
| CN | 108176857 A | * | 6/2018 |

(Continued)

OTHER PUBLICATIONS

Li, Qiuyan, et al., "Characterization of Materials Fabricated by Additive Manufacturing Method Using Line Focused Ultrasonic Transducer," Nov. 2016, Downloaded from https://asmedigitalcollection.asme.org/IMECE/proceedings-pdf/IMECE2016/50633/V009T17A010/2497897/v009t17a010-imece2016-67186.pdf by Honeywell Aerospace user on Feb. 13, 2020.

*Primary Examiner* — Jerzi H Moreno Hernandez
(74) *Attorney, Agent, or Firm* — Ingrassia Fisher & Lorenz, LLP

(57) ABSTRACT

Systems and methods resolve stresses in additive manufacturing. A stress resolution profile including frequency and amplitude parameters of an ultrasonic input are determined based on physical properties of the product. Successive layers of a material are added and energy is applied to incorporate the material of each layer into the product. An ultrasonic input is applied with the determined parameters to resolve stress as the product is built up. The ultrasonic input is varied as a depth of the material incorporated into the product increases.

11 Claims, 6 Drawing Sheets

(56) References Cited

U.S. PATENT DOCUMENTS

| | | | |
|---|---|---|---|
| 11,772,330 B2 * | 10/2023 | Bowler | B33Y 50/02 700/119 |
| 2007/0040005 A1 | 2/2007 | Iordache et al. | |
| 2009/0049912 A1 | 2/2009 | Wu | |
| 2013/0101728 A1 | 4/2013 | Keremes et al. | |
| 2015/0041025 A1 | 2/2015 | Wescott et al. | |
| 2015/0314373 A1 | 11/2015 | Mironets et al. | |
| 2017/0059529 A1 | 3/2017 | Kamel et al. | |
| 2017/0087670 A1 | 3/2017 | Kalentics et al. | |
| 2018/0161934 A1 * | 6/2018 | Boswell | B33Y 50/02 |

FOREIGN PATENT DOCUMENTS

| | | | |
|---|---|---|---|
| CN | 110586941 A | * | 12/2019 |
| EP | 1238715 A1 | | 9/2002 |
| RU | 2691447 C1 | | 6/2019 |
| WO | 2021084162 A1 | | 5/2021 |

* cited by examiner

TUNABLE SYSTEM AND METHOD FOR STRESS RESOLUTION IN ADDITIVE MANUFACTURING

CROSS REFERENCE TO RELATED APPLICATION

This application is a continuation of and claims the benefit of co-pending U.S. patent application Ser. No. 16/872,618 filed on May 12, 2020. The disclosure of the above referenced application is incorporated herein by reference.

TECHNICAL FIELD

The present invention generally relates to additive manufacturing, and more particularly relates to a tunable stress resolution approach for the accurate and quality build of complex structures by additive manufacturing.

BACKGROUND

Various types of items are being created using additive manufacturing processes. Additive manufacture includes processes such as those that create a component or item by the successive addition of particles, layers or other groupings of a material onto one another. An item is generally built using a computer controlled machine that is programmed with a model which is a digital representation of the item, and includes processes such as 3-D printing. A variety of different additive manufacturing processes are used such as metal printing processes that involve directed energy deposition, laser metal powderbed fusion, material jetting, and other methods.

During a typical additive manufacturing build, stresses accumulate in the product being built. As the stresses accumulate, undesirable outcomes such as distortion, imperfections, cracking, etc. may occur. The result is that the item being built may not meet dimensional or other quality requirements. This limits the use of additive manufacturing in applications where the item's structural accuracy or dimensional requirements cannot be repeatedly accomplished. For metallic components, stress relief may be attempted post-build using some form of heat treatment. Both the machines to complete the heat treatments and the time to process the parts through the heat treatment stage add both time and cost into the final parts. The stress accumulation problem has been addressed by the development of specialty software that analytically predicts the negative outcomes and adjusts/pre-compensates the build geometry design at those locations to attempt to offset the distortion or creation of such imperfections. Such software may be costly and time consuming to implement. In sum, significant additional costs may arise in additive manufacturing due to a combination of additional processing time and reduced yield. Therefore, the application of additive manufacturing as a viable alternate manufacturing option is limited.

Accordingly, it is desirable to provide improved systems and methods for managing stresses in additive manufacturing to produce dimensionally accurate and quality parts and to expand the applications of additive manufacturing. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description section. This summary is not intended to identify key or essential features of the claimed subject matter, nor is it intended to be used as an aid in determining the scope of the claimed subject matter.

Systems and methods are provided that resolve stresses in additive manufacturing. In a number of embodiments, a stress relief profile of an ultrasonic input is determined based on physical properties of the product. Successive layers of a material are added and energy is applied to incorporate the material of each layer into the product. An ultrasonic input is applied according to the determined parameters to resolve stresses as the product is built up. The ultrasonic input is dynamically changed as a function of material thickness along the additive build direction to account for the changes in residual stresses due to increased thermal mass of the built-up part of the product.

In a number of additional embodiments, an ultrasonic transducer is coupled with a build platform. A powder delivery system adds successive layers of a material to build the product. A laser system adds energy to incorporate the material of each layer into the product. A controller applies a signal to the ultrasonic transducer to produce an ultrasonic input having parameters to resolve stresses as the product is built up, and the ultrasonic input is dynamically changed as a function of material thickness along the additive build direction.

In other embodiments, a stress relief profile with frequency and amplitude parameters of an ultrasonic input are determined based on physical properties of the product. A powder delivery system adds successive layers of a material to build the product. A laser system adds energy to incorporate the material of each layer into the product. An ultrasonic transducer applies the ultrasonic input with the determined parameters to resolve stress as the product is built up, and varies the frequency and amplitude as a depth of the material incorporated into the product increases. Additionally, the ultrasonic transducer applies an acoustic profile tailored to settle the powder layers on the built-up part thereby resulting in increased densification of the material.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
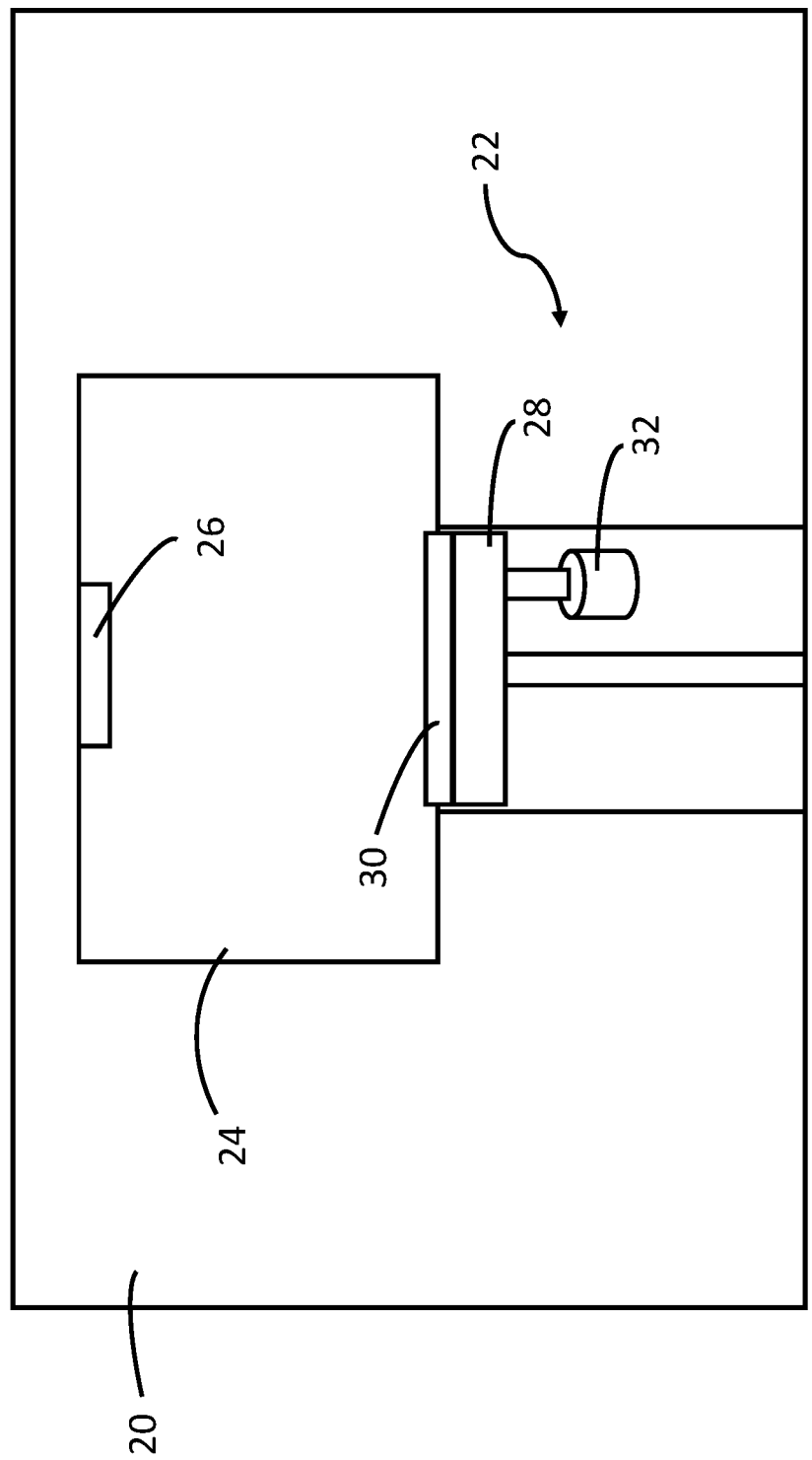
FIG. 1 is a schematic illustration of a system for stress resolution in laser metal powderbed fusion, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. Such block components (or modules) may be realized by any number of hardware, software, and/or firmware components configured to perform the specified functions.

The various illustrative logical blocks, modules, and circuits described in connection with the embodiments disclosed herein may be implemented or performed in a controller with a general purpose processor, a digital signal processor, an application specific integrated circuit, a field programmable gate array or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The steps of a process, method or algorithm described in connection with the embodiments disclosed herein may be embodied directly in hardware, in a software module executed by a processor, or in a combination of the two. A software module may reside in any form of storage medium known in the art. An exemplary storage medium may be coupled to the processor such that the processor reads information from, and writes information to, the storage medium. In the alternative, the storage medium may be integral to the processor.

In a number of embodiments described herein, systems and methods for forming a product by additive manufacturing include determining stress relief profile parameters of an ultrasonic input based on physical properties of the product. A material is deposited by additive manufacturing to build up the product. With materials such as nickel, titanium and aluminum, if not resolved, extreme stresses may accumulate during the additive manufacturing build. As a result, the item being built may crack prior to being able to submit the parts into a post-build stress relief cycle. Accordingly, ultrasonic input is applied to the deposited material to dynamically relieve stresses as the product is built up. In a number of embodiments, the ultrasonic input is varied as a material thickness along the additive build direction depth increases. In additional embodiments, in-situ measurement data may be collected to provide direct input into the ultrasonic cycle to provide customized stress relief treatment based on measurement data showing where and to what degree a part is deforming as an external indication of internal stresses. While the exemplary embodiments described herein may involve particular additive manufacturing processes, the systems and methods of the current disclosure are not limited to those specific processes and may be employed in any number of build applications where dynamic stress relief is desired.

Referring to FIG. 1, a build system 20 with a stress resolution system 22 is schematically illustrated. In this embodiment, the build system 20 is a laser metal powderbed fusion system and includes a build chamber 24 that defines a sealed environment for processing. A laser system 26 is disposed within the build chamber 24 for melting a powder that is selectively deposited one layer at a time. A build platform 28 is configured for repositioning at various heights within the build chamber 24 during a build process. A build plate 30 is attached to the build platform 28 to move therewith, and to provide a surface upon which the products being built are disposed. An ultrasonic transducer 32 is coupled with the build platform 28. Inside the build chamber 24, powder (not shown), is spread on the surface of a build plate 30. A laser beam from the laser system 26 is selectively directed on the deposited powder to melt or sinter the layer of powder while also anchoring it to the build plate 30. The build platform 28 is then lowered by the depth of one layer. Additional powder is recoated over the surface, such as with a roller, blade or wiper (not shown), and the process repeated for the next layer. In a number of embodiments, the process may be paused briefly at a given layer or layers and the ultrasonic transducer 32 is activated according to a stress relief profile at an optimal frequency, power and spectrum for the given material and machine to relieve the residual stresses from metal solidification and cooling, then the additive manufacturing operation is continued. In additional embodiments, the ultrasonic transducer 32 is activated according to a stress relief profile concurrent with operation of the laser system 26 to prevent the creation of stresses. The number of layers in various product builds vary significantly. The build layer interval between stress relief actions decreases as crack propensity increases. For purposes of the present disclosure, stress resolution means relieving stresses that have accumulated and also means avoiding stresses before they accumulate.

Figure 2:
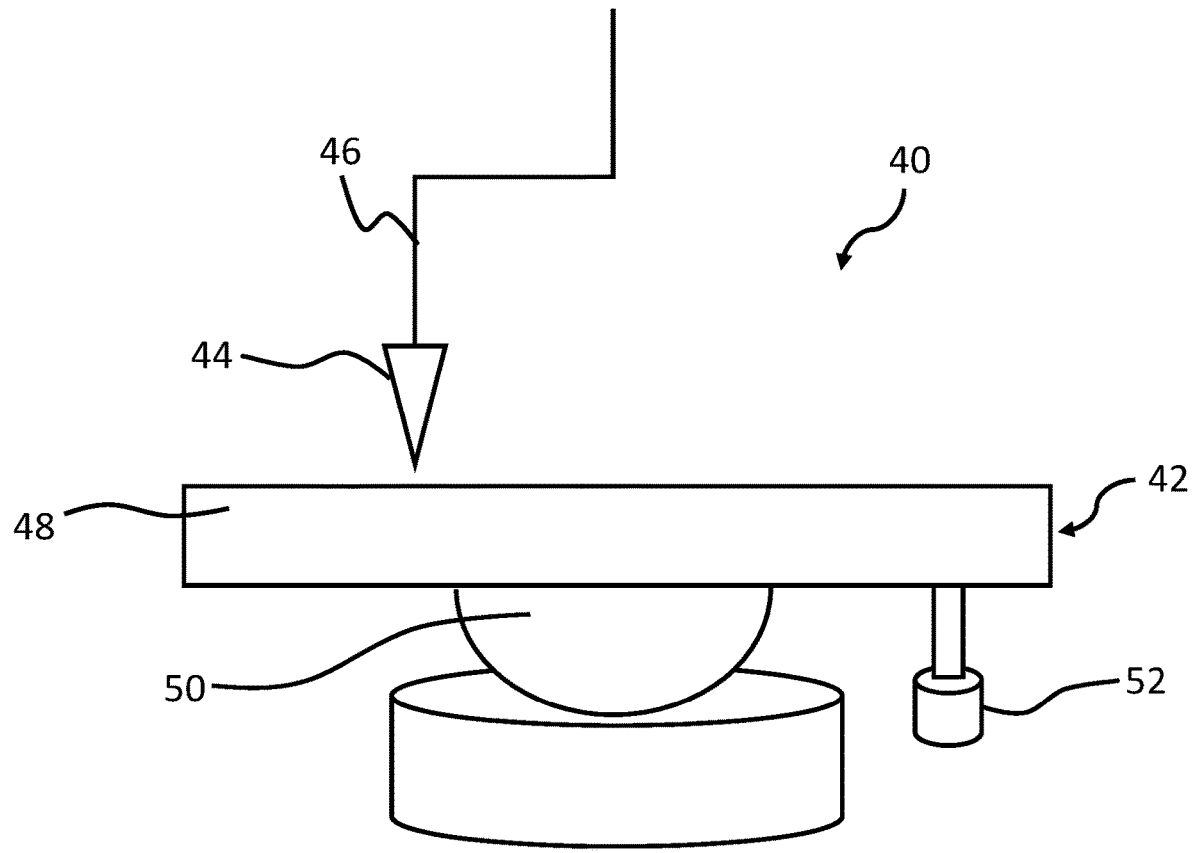
FIG. 2 is a schematic illustration of a system for stress resolution in direct energy deposition, according to an exemplary embodiment.

Referring to FIG. 2, an embodiment with a directed energy deposition system 40 with a stress resolution system 42 is schematically illustrated. The directed energy deposition system 40 involves focusing an area of intense energy into an introduced material to bond to the surrounding material. The material may be introduced through blowing, spraying, pushing or other means. In this embodiment, a directed energy deposition head 44 is attached to 5-axis movable head carrier 46. Material is applied to the build plate 48 and melted by the directed energy deposition head 44. The build plate 48 is attached to a 2-axis rotatable build platform 50. An ultrasonic transducer 52 is coupled to the build plate 48. During the directed energy deposition, material deposition may be paused briefly and the ultrasonic transducer 52 is activated according to a stress relief profile at the optimal frequency, power and spectrum for the given material and machine to relieve the residual stresses from metal solidification and cooling, then normal operation would be restarted. In additional embodiments, the ultrasonic transducer is activated during the deposition of material. This may change the grain structure of the material as the metal solidifies avoiding the creation of stresses altogether.

Figure 3:
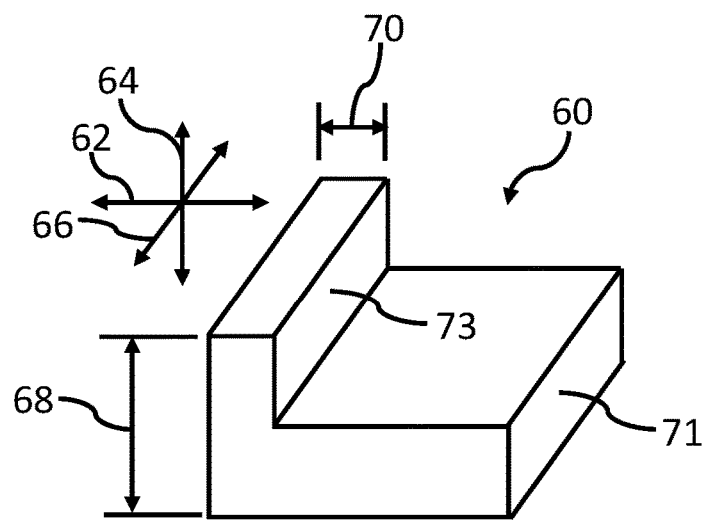
FIG. 3 is a perspective illustration of a product for additive manufacture build, according to an exemplary embodiment.

As illustrated in FIG. 3, an exemplary product 60 is shown as a candidate for additive manufacture using the systems and methods disclosed herein. The product 60 is a three dimensional object defined in the x direction 62, the y direction 64, and the z direction 66. In this example the product 60 is a relatively simple object with a height 68 in the y direction 64, but it will be appreciated that in various applications the geometry will be much more complex. However, even in this example the product 60 has a width 70 in the x direction 62 that varies significantly with the height 68 between segment 71 and segment 73. Accordingly, the need to resolve stresses will be different as the width 70 varies at different heights 68. For example, the properties of segment 71 may vary significantly from the properties of segment 73 for use in determining the applicable stress relief profile.

Figure 4:
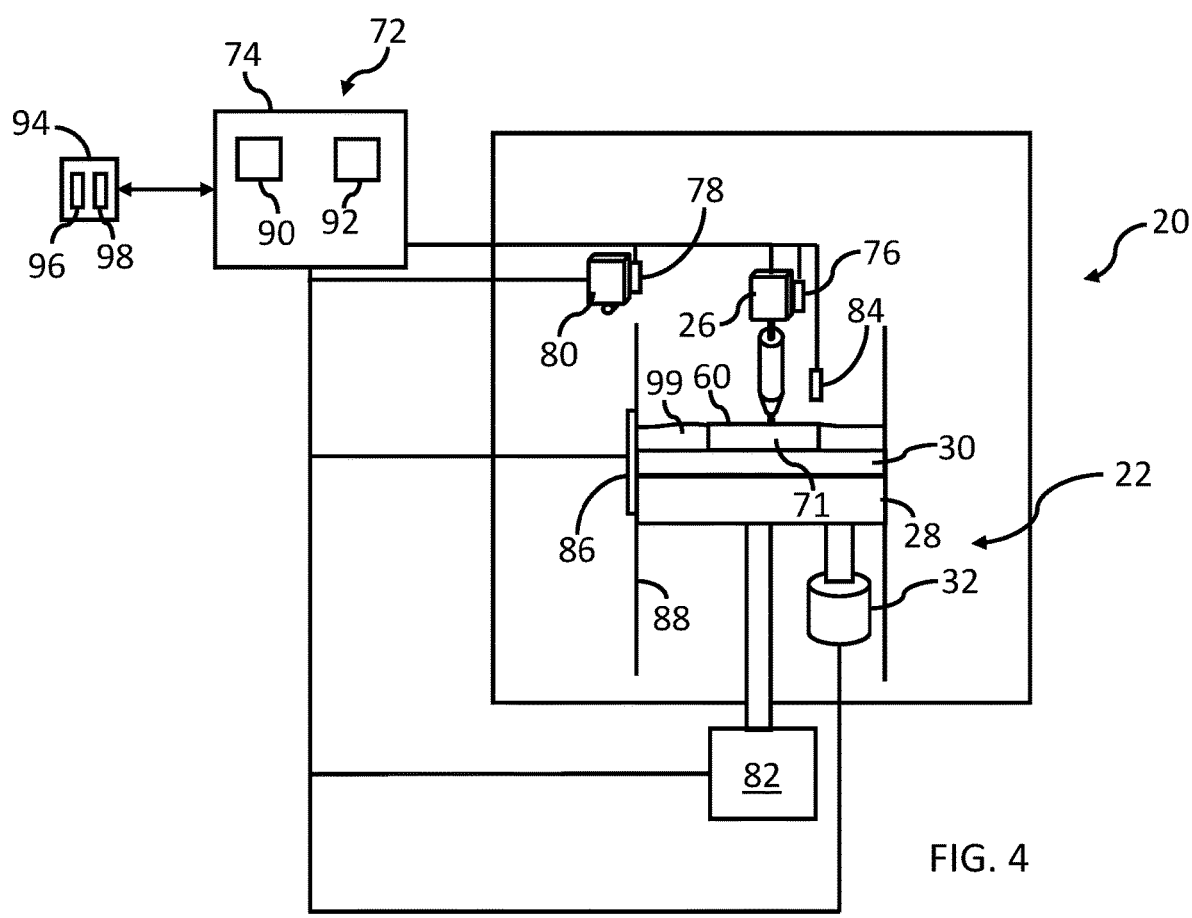
FIG. 4 is a schematic illustration of a stress resolution system in a first state of build, according to an exemplary embodiment.

With reference to FIG. 4, the build system 20 is illustrated in greater detail and generally includes the stress resolution system 22, which includes a control system 72. The control system 72 includes a controller 74. In other embodiments, any number of controllers may be used in place of the controller 74. For purposes of the current embodiment, the controller 74 controls operation of the build system 20 including of a powder delivery system 80 via the actuator 78, the laser system 26 via the actuator 76, and the height of the build platform 28 via the actuator 82. The controller 74 may comprise any number of electronic control modules and receive various input variables of current operating conditions and other parameters. The inputs are analyzed and operating parameters such as operation of the laser system 26, ultrasonic transducer 32, and others are computed from the data and applied to the actuators 76, 78 and other responsive devices as appropriate. The controller 74 may receive various signals, including from a sensor suite 84 and a position sensor 86, conduct analyses, and send control signals to various destinations, including to the actuators 76, 78 and the ultrasonic transducer 32. The actuator 78 may be a linear motor or a combination of motors or other actuators to deliver a layer of powder to the build plate 30. The actuator 76 may be a multi-axis locator to move the laser system 26 vertically and horizontally. The actuator 82 may be a piston or motor to move the build platform 28 vertically within the cylinder 88. The position sensor 86 senses the vertical position of the build platform 28. The sensor suite 84 senses various aspects of the product 60 and its build including detecting its physical disposition for detecting distortion. Accordingly, the sensor suite 84 may include position sensors, optical sensors, and other sensors as described below.

The controller 74 may comprise any number of electronic control modules, including the exemplary modules described below. The controller 74 receives information from various sources, process that information, and provides control signals/commands based thereon to effect operation of the build system 20. The controller 74 includes a processor 90 and a memory device 92, and is coupled with a storage device 94. The processor 90 performs the computation and control functions of the controller 74 and during operation executes one or more programs 96 and may use data 98, each of which may be contained within the storage device 94 and as such, the processor 90 controls the general operation of the controller 74 in executing the processes described herein, such as the processes described further below. The memory device 92 may be any type of suitable memory or combination of memory devices capable of storing data, some of which represent executable instructions, used by the controller 74. In the illustrated embodiment, the memory device 92 may store the above-referenced programs 96 along with one or more stored values of the data 98 such as for short-term data access. The storage device 94 stores data, such as for long-term data access for use in automatically controlling the build system 20 and may be any suitable type of storage apparatus. In an exemplary embodiment, the storage device 94 comprises a source from which the memory device 92 receives the programs 96 and data 98. The programs 96 represent executable instructions, used by the controller 74 in processing information and in controlling the build system 20, including the stress resolution system 22. The processor 90 may generate control signals for the build system 20, including the stress resolution system 22 based on the logic, calculations, methods, and/or algorithms.

As the build progresses, powderbed 99 is deposited in individual layers on the build plate 30 and the laser system 26 selectively energizes the powder to form the product 60 according to its design parameters. The ultrasonic transducer 32 may be activated after a layer is fused into the product 60 or while the fusing is taking place. The layers for which the ultrasonic transducer 32 is activated may be predefined and stored in memory and may be recalled according to the location of the build platform 28 as sensed by the position sensor 86. In other embodiments, the sensor suite 84 may be monitored to determine whether distortion or other aspects of the product 60 indicate activation of the ultrasonic transducer 32 is needed to provide stress resolution.

Figure 5:
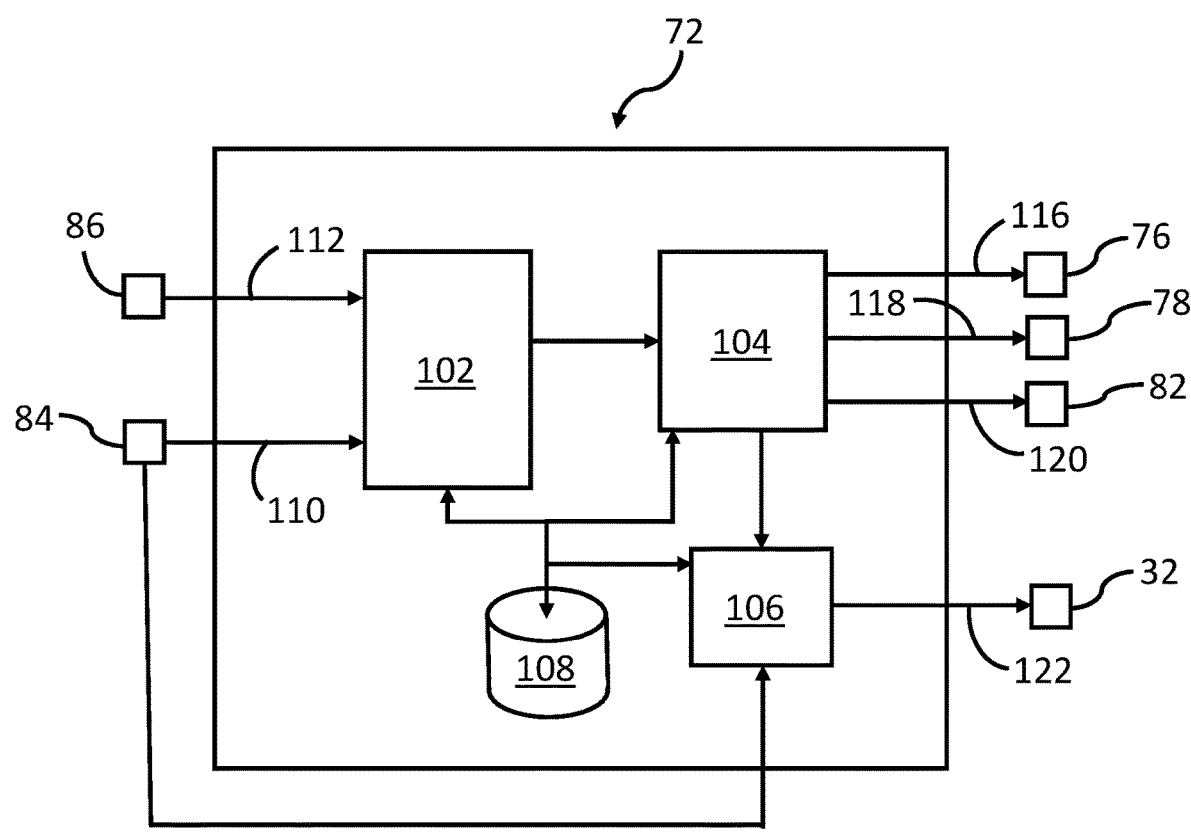
FIG. 5 is a is a diagram of a control system for controlling the stress resolution system of FIG. 4, according to an exemplary embodiment.

As illustrated in FIG. 5, the control system 72 may include a number of modules to operate the build system 20, including the stress resolution system 22. In embodiments, the control system 72 generally includes a stress resolution module 102, an actuator control module 104, an ultrasonic operation module 106, and a datastore 108. The control system 72 may include any number of additional modules to control aspects of the build system 20 independent of, or in coordination with, the modules shown in FIG. 5. Inputs may include a signal 110 from the sensor suite 84 and a signal 112 from the position sensor 86. Outputs may include a signal 116 to operate the actuator 76 of the laser system 26, a signal 118 to operate the actuator 78 of the powder delivery system 80, a signal 120 to operate the actuator 82 of the build platform 28, and a signal 122 to operate the ultrasonic transducer 32. In general, when a determination is made to operate the ultrasonic transducer 32 to resolve stresses, the ultrasonic operation module 106, delivers the signal 122 to the ultrasonic transducer 32 to impart energy through the build platform 28 and the build plate 30 to the in-process product 60 to relieve or avoid stresses therein.

Figure 6:
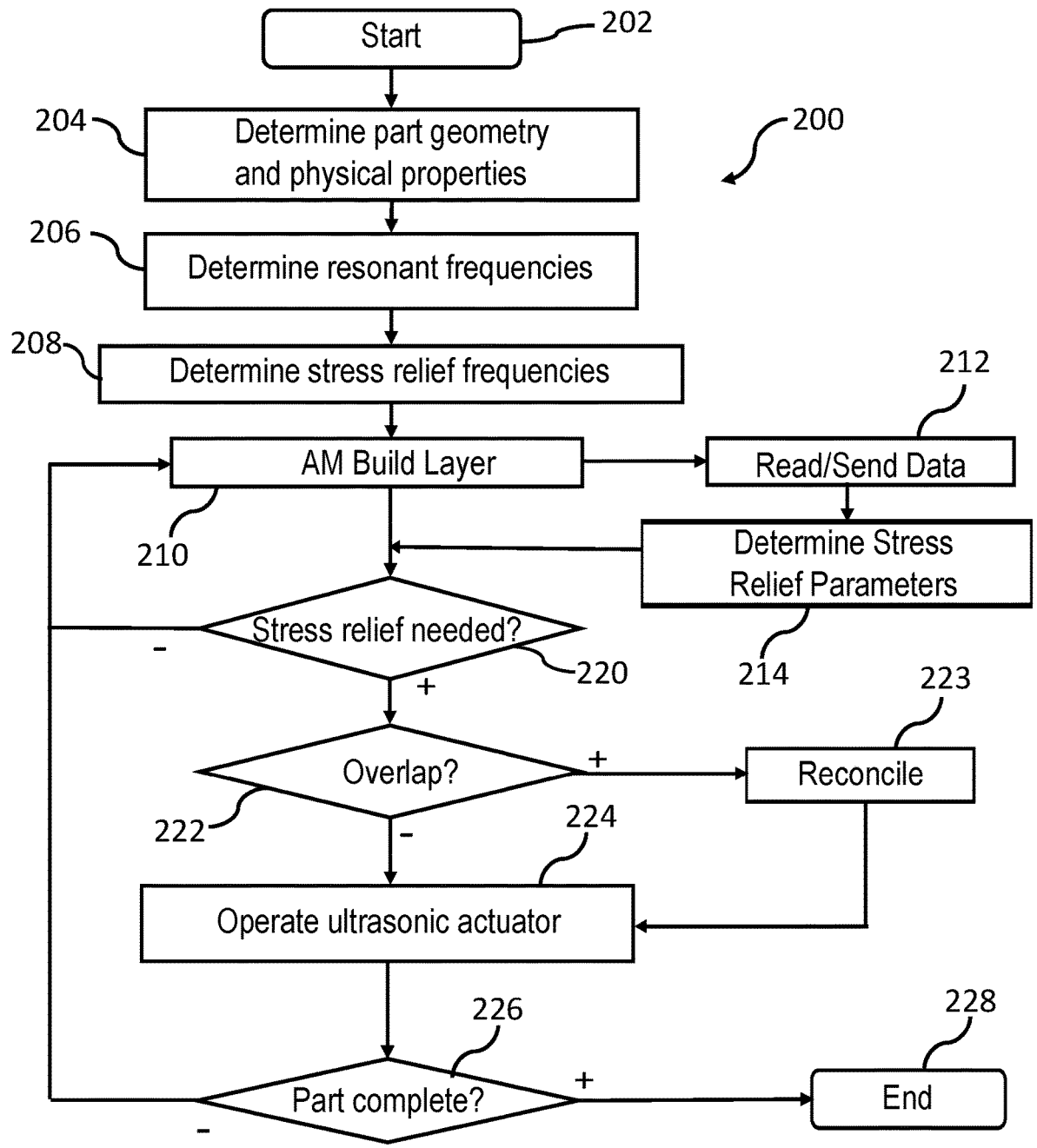
FIG. 6 is a flow chart of a method for operation of a stress resolution system, according to an exemplary embodiment.

Referring additionally to FIG. 6, a process 200 to resolve stresses begins 202 with the geometry and physical properties of the exemplary product 60 being determined 204 according to design requirements. For example, the physical dimensions of the product 60 are determined 204 and the material from which the product 60 will be made is determined 204. Given the geometry, predeterminations 206, 208 may be made by analysis such as based on calculations and/or testing. More specifically, resonant frequencies of the product 60 may be determined 206 for the product 60 as partially built through various build layer stages. The resonant frequencies of the product 60 may be calculated and vary as the height of the build progresses. In a simple example of printing a straight, vertical rectangular bar such as the segment 73 of the product 60, as the build progresses the resonant frequency of the segment will decrease as it becomes higher. In a build with multiple parts or segments with complex geometries, as the build progresses the resonant properties of the system will change throughout the build. For example, the resonant frequencies between the segments 71 and 73 will differ substantially. Resonant frequencies for given build configurations (at specific build layers, or cross sections) may be determined with analytical software or by using the results of machine-learning data from prior builds. Once determined 206, the resonance data may be stored, such as in the datastore 108.

Figure 7:
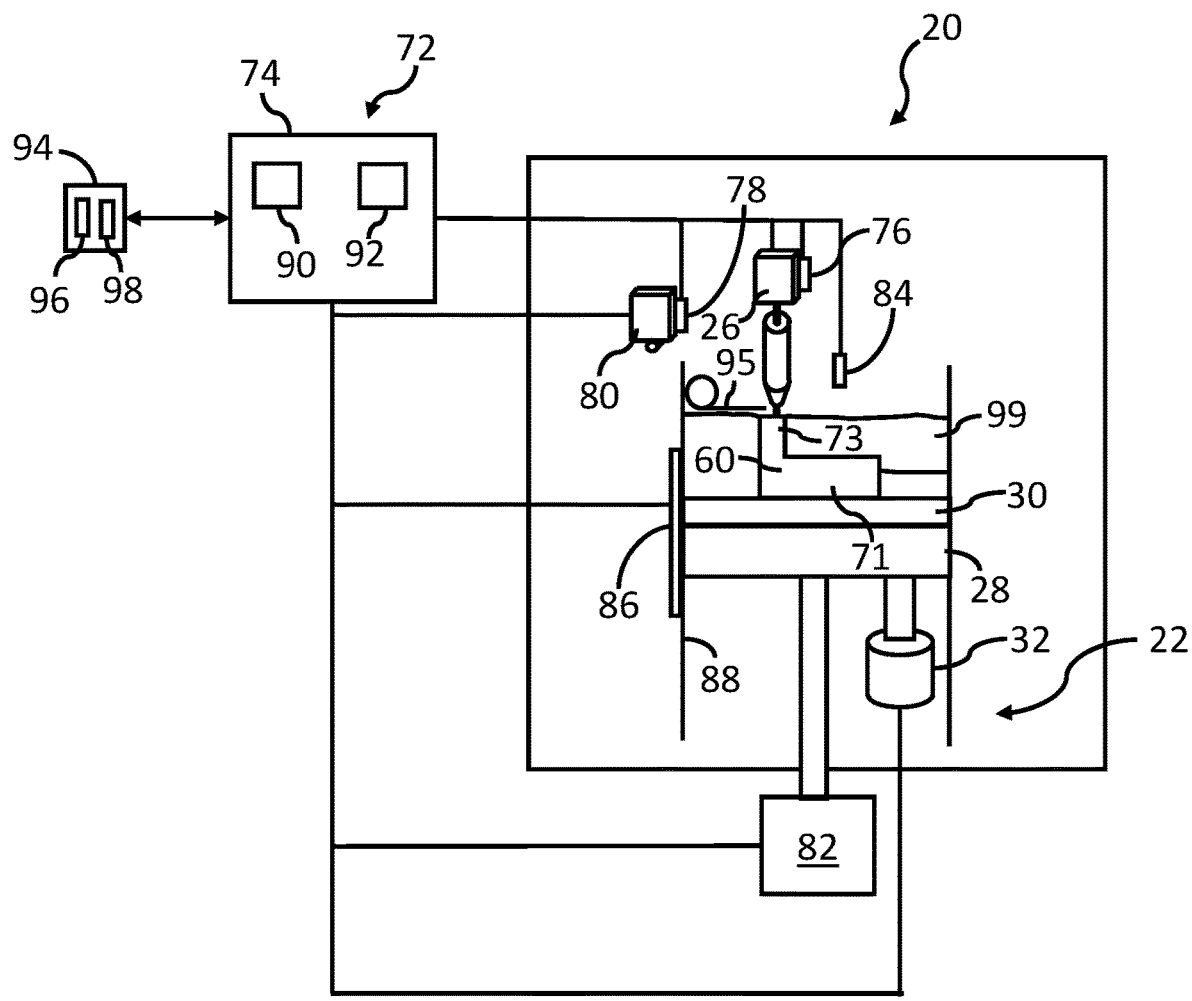
FIG. 7 is a schematic illustration of the stress resolution system of FIG. 4 in a second state of build, according to an exemplary embodiment.

A stress relief profile, including stress relief frequencies and power levels may be determined 208, such as in advance based on modeling, experimentation and/or testing of the product 60. The process 200 proceeds to build 210 a layer of the product 60, such as by operation of the actuators 76, 78 via the actuator control module 104 to deposit material and incorporate the layer into the product 60. Where predetermined for a given product 60, the stress relief frequencies and power levels may be stored, such as in the datastore 108 for given build layers. The frequency and power level of the energy supplied by the ultrasonic transducer 32 is tailored to the physical properties of the product 60, including the material used for fabrication, and varies by build level. For example, as shown in FIG. 4, as the segment 71 is being built, the properties will be different than those as the segment 73 is being built as shown in FIG. 7. In the current embodiment, the stress resolution module 102 may determine the frequency and power levels based on data retrieved from the datastore 108. The ultrasonic transducer 32 is activated according to the stress relief profile at the optimal frequency, power and spectrum for the given material and machine to relieve the residual stresses, such as may arise from metal solidification and cooling.

In a number of embodiments, the stress relief profile including power and frequency for the ultrasonic excitation may be determined 214, such as by the stress resolution module 102, based on inputs obtained during the build that are read 212, such as from the sensors 84, 86. The sensor 86 provides feedback on the build layer of the product 60 and the sensor suite 84 provides information on the product 60, including where a deviation from the design dimensions may be actual or incipient. Sensing distortion enables targeting ultrasonic inputs to individual layers where stress resolution is needed based on the actual build underway. In addition, the collected data may be stored 216 and/or transmitted. For example, an industrial internet of things application may transmit in-situ measurement data to provide direct input of the ultrasonic cycle to provide customized stress relief treatment based on measurement data showing where and to what degree a part is deforming as an external indication of internal stresses.

In embodiments, automated adjustments are made to the stress relief profile and stored, such as for use in the determination 208, when distortion or other parameters measured exceed set limits. Anticipated build process monitors in the sensor suite 84 may include melt pool sensors, thermal sensors, optical distortion sensors, build plate strain gauges, and others. Data from the sensors is aggregated and implemented into system software that learns as the system matures and incorporates feedback from other connected systems. In a number of embodiments, by iteratively processing build data against stress resolution inputs and other build parameters, the ultrasonic stress resolution may be used to automatically determine an optimal stress relief profile for a new part (or mix of parts) to be printed.

With the stress relief profile determined 208, 214, an evaluation 220 is made to verify whether ultrasonic stress resolution is needed for the product 60 at the stage of the newly built layer. For example, when the determination 208 is based on a predetermined and stored data, the evaluation 220 outcome is positive when the layer built coincides with one targeted for stress resolution. Also, for example, when the determination 214 concludes that deformation is incipient or started, the evaluation 220 outcome is positive when the layer just built requires stress resolution to correct deformation. When neither is found, the evaluation 220 outcome is negative, and the process 200 returns to build 210 another layer such as by depositing powder by the powder delivery system 80 and activation of the laser system 26.

Following a positive determination 220, the process 200 continues with an evaluation 222 as to whether there is overlap between resonant frequencies of the product 60 in its current configuration and the determined 208, 214 frequency. Effectively resolving the stresses in the additive manufactured product 60 includes adapting the frequencies of the ultrasonic input to optimize for the changing harmonic characteristics of a part. This involves exciting at certain frequencies, while excluding other frequencies to be able to both relieve the stresses built up within the build and to avoid damaging vibrations due to hitting certain resonant frequencies. When the outcome of the evaluation 222 is negative, and there is no overlap between the determined frequency and the resonant frequency, the process 200 proceeds to operate 224, the ultrasonic transducer 32 according to the stress relief profile. When the evaluation 222 is positive, meaning there is overlap between the resonant frequency and the determined 208/214 frequency, the process 200 reconciles 223 the overlap. For example, the frequency delivered by the ultrasonic transducer 32 may be revised to fall outside the resonant frequency range to avoid damaging resonant vibrations. The result is to tune each exposure of ultrasonic cycles throughout the build to selectively excite the system to resolve the stresses while avoiding resonant frequencies.

With the frequency and power of the ultrasonic input determined 208, 214 and the need for stress resolution verified 220, along with any reconciliation 223, the process 200 proceeds to operate 224 the ultrasonic transducer 32, such as by the signal 122 from the ultrasonic operation module 106. The build system 20 is widely capable of efficiently adjusting both frequency content and amplitude to adjust to the resonant characteristics of a wide range of build profiles containing any combination of parts to be manufactured. A high-power, tunable build system 20 enables delivering the stress resolution energy input through the single ultrasonic transducer 32. When the process 200 determines 226 that the product 60 is complete, the process ends 228. When the determination 226 is negative, the process 200 returns to build 210 an additional layer.

In embodiments with metal powderbed style additive manufacturing, a cover 95 (FIG. 7), such as a plate or sheet that covers the metal powderbed during the ultrasonic exposure period may be used to prevent scatter of metal powder out from the build area. Operation of the laser system 26 is suspended when the cover 95 is deployed. The cover 95 may be any variation of a sheet, film or plate, and may be pulled by the powder delivery system 80 over the powderbed 99. In other embodiments, the cover 95 may be a sheet, film or plate that is lowered or slid over the powderbed 99. In some embodiments, following step 224, the stress resolution treatment, the ultrasonic transducer 32 is separately activated to produce a different acoustic profile tailored to settle and compact the metal powderbed 99.

Through the examples described herein, stress resolution is effected during the additive manufacture of items. Resolving stress while a product is being made improves quality part yield and reduces costs. In addition, part distortion is mitigated or eliminated from occurring. Using ultrasonic energy driven into the components through the build platform, relieves the stresses accumulating in the build and may be addressed before reaching a point of either inducing distortion or ultimately cracking. The ultrasonic stress resolution system is compact, low-cost, energy efficient and has a relatively small footprint. Advantageously, parts may be manufactured with significantly higher speeds and yields for reduced costs and at shorter lead-times. Additionally, the systems and methods disclosed herein enable fabricating components from materials and with geometries that otherwise would not be viable using additive manufacturing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for stress relief in forming a product by additive manufacturing, the system comprising:
    a build surface;
    a stress relief system including a transducer coupled with the build surface, the transducer configured to generate a frequency and a power so the stress relief system is configured to deliver stress relief energy to the build surface;
    a material delivery system configured to add successive layers of a material to build the product on the build surface;
    an energy system configured to add build energy to incorporate the material of each of the successive layers into the product; and
    at least one controller configured to:
        coordinate operation of the stress relief system, the material delivery system and the energy system to complete the build of the product;
        determine stress relief parameters throughout the build of the product, where the stress relief parameters include frequency and amplitude parameters and are at least one of predetermined or based on input from at least one sensor;
        determine, by a processor of the at least one controller and based on the stress relief parameters, where, during the build of the product, stress relief is required based on where a deviation from design parameters of the product is indicated as incipient or actual; and
        apply, by the transducer of the stress relief system and when the processor has determined that the stress relief is required, an input to the stress relief system with a power level tailored to relieve stress according to the stress relief parameters as determined by the at least one controller.

2. The system of claim 1, wherein the transducer comprises an ultrasonic transducer, wherein the at least one controller is configured to deliver, via the ultrasonic transducer of the stress relief system, a customized stress relief treatment of the product based on measurement data from the at least one sensor showing where and to what degree the product is deforming, or is about to deform, as an external indication of internal stresses.

3. The system of claim 1, wherein the at least one controller is configured to define and to optimize the build of the product, and is configured to make automated adjustments to the stress relief parameters when distortion measured by the at least one sensor exceeds set limits.

4. The system of claim 1, wherein the at least one controller is configured to determine whether there is overlap between resonant frequencies of the product in its current configuration and the frequency of the stress relief parameters and to avoid the resonant frequencies.

5. The system of claim 1, wherein the at least one controller is configured to automatically generate the stress relief parameters for a new product, and is configured to aggregate data from the at least one sensor and iteratively process the data against the stress relief parameters and other parameters of a new part to be printed to automatically determine an optimal stress relief parameter set for the new part.

6. The system of claim 1, wherein the stress relief parameters are based on input from the at least one sensor and the design parameters comprise design dimensions of the product.

7. The system of claim 1, wherein the stress relief parameters are defined by a profile, wherein the at least one controller is configured to access the profile for each individual layer of the successive layers, and to apply the input only when the profile indicates the deviation from design parameters exists.

8. The system of claim 1, wherein the build surface is configured to support a powder bed and comprising a cover configured to cover the powder bed during the apply of the input by the stress relief system.

9. The system of claim 1, wherein the transducer comprises an ultrasonic transducer, configured to apply the input to the stress relief system.

10. The system of claim 1, wherein the at least one controller comprises a plural number of controllers configured to:
    collect data from the at least one sensor;
    transmit the data;
    create customized stress relief treatments based on the data to automatically determine optimal stress relief parameters; and
    effect, through the stress relief system, the stress relief of internal stresses during the build of the product.

11. A system for stress relief in forming a product by additive manufacturing, the system comprising:
    a build surface;
    a stress relief system including an ultrasonic transducer coupled with the build surface, the stress relief system configured to deliver stress relief energy to the build surface;
    a material delivery system configured to add successive layers of a material to build the product on the build surface;

an energy system configured to add build energy to incorporate the material of each of the successive layers into the product; and at least one controller configured to:

coordinate operation of the stress relief system, the material delivery system and the energy system to complete the build of the product;

determine stress relief parameters throughout the build of the product to define a profile, where the stress relief parameters include frequency and amplitude parameters and are at least one of predetermined or based on input from at least one sensor;

determine, by a processor of the at least one controller and based on the stress relief parameters, where, during the build of the product, stress relief is required based on where a deviation from design parameters of the product is indicated as incipient or actual; and apply, by the ultrasonic transducer of the stress relief system and only when the at least one controller has determined that the stress relief is required, an input to the stress relief system with a power level according to the profile that is tailored to relieve stress according to the stress relief parameters as determined by the at least one controller.

* * * * *